(12) United States Patent
Mulé et al.

(10) Patent No.: US 9,292,951 B2
(45) Date of Patent: Mar. 22, 2016

(54) SERVICE COVERAGE IDENTIFICATION USING AUGMENTED REALITY

(71) Applicant: Cable Television Laboratories, Inc., Louisville, CO (US)

(72) Inventors: Jean-François Mulé, San Francisco, CA (US); Michael Smith, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 235 days.

(21) Appl. No.: 13/792,087

(22) Filed: Mar. 10, 2013

(65) Prior Publication Data

US 2014/0055490 A1 Feb. 27, 2014

Related U.S. Application Data

(60) Provisional application No. 61/691,956, filed on Aug. 22, 2012.

(51) Int. Cl.
| | |
|---|---|
| *G06T 19/00* | (2011.01) |
| *H04L 12/26* | (2006.01) |
| *H04L 12/24* | (2006.01) |
| *G06T 11/80* | (2006.01) |
| *H04N 21/442* | (2011.01) |
| *G06T 11/00* | (2006.01) |
| *G06T 11/20* | (2006.01) |
| *H04N 21/222* | (2011.01) |
| *H04N 21/414* | (2011.01) |
| *H04N 21/4223* | (2011.01) |
| *H04N 21/431* | (2011.01) |
| *H04W 24/00* | (2009.01) |
| *H04N 21/485* | (2011.01) |
| *H04W 16/18* | (2009.01) |

(52) U.S. Cl.
CPC ............. *G06T 11/80* (2013.01); *G06T 11/00* (2013.01); *G06T 11/206* (2013.01); *G06T 19/006* (2013.01); *H04L 43/045* (2013.01); *H04N 21/2223* (2013.01); *H04N 21/41407* (2013.01); *H04N 21/4223* (2013.01); *H04N 21/4316* (2013.01); *H04N 21/44209* (2013.01); *H04N 21/44218* (2013.01); *H04W 24/00* (2013.01); *H04N 21/485* (2013.01); *H04W 16/18* (2013.01)

(58) Field of Classification Search
CPC ....... G06T 19/006; H04L 41/20; H04L 41/14; H04L 12/2602
See application file for complete search history.

(56) References Cited

U.S. PATENT DOCUMENTS

2005/0043933 A1* 2/2005 Rappaport et al. ............. 703/1
2013/0339864 A1* 12/2013 Uusitalo et al. ............ 715/736

* cited by examiner

*Primary Examiner* — Matthew D Salvucci
(74) *Attorney, Agent, or Firm* — Great Lakes Intellectual Property, PLLC

(57) ABSTRACT

Facilitating service coverage identification using augmented reality is contemplated. The service coverage information may relate to wireless signaling metrics collected for wireless access points. A reality view captured with a mobile device to reflect an area proximate the access points may augmented with the service coverage information such that the resulting augmented reality view identifies variances or other parameters of the service coverage information relative to the mobile device.

12 Claims, 8 Drawing Sheets

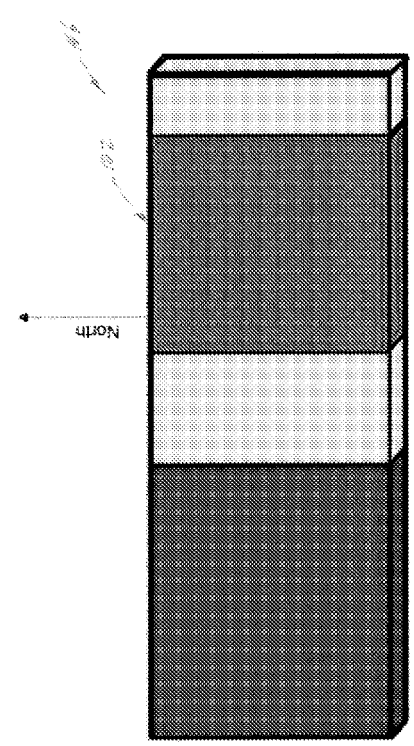
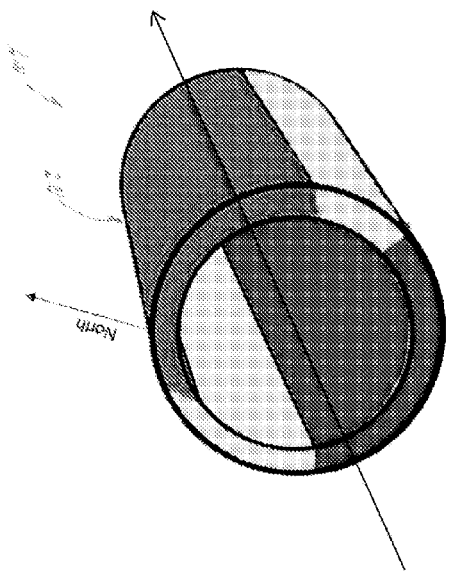
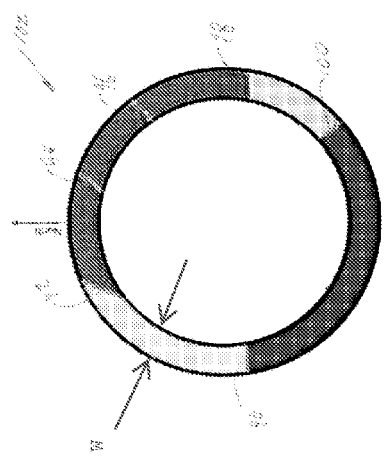
Fig. 5
Fig. 6
Fig. 4

US 9,292,951 B2

SERVICE COVERAGE IDENTIFICATION USING AUGMENTED REALITY

CROSS-REFERENCE TO RELATED APPLICATIONS

This application claims the benefit of U.S. provisional Application No. 61/691,956, filed Aug. 22, 2012, the disclosure of which is incorporated in its entirety by reference herein.

TECHNICAL FIELD

The present invention relates to the use of augmented reality to facilitate conveying information, such as but not necessarily limited to use of augmented reality to facilitate service coverage identification and/or enable service selection.

BACKGROUND

When endeavoring to access wireless services, an individual may experience difficulties in first locating suitable wireless signaling access points and then identifying the quality of the service at these locations. The difficulties may result from the individual being in a new area and unfamiliar with locations where wireless access points are likely to be and/or being unable to assess whether the access points are likely to have capabilities sufficient to meet the wireless signaling and ultimately the wireless quality of service demands of the individual. Accordingly, the present invention contemplates ameliorating these types of difficulties by assisting the individual in locating suitable wireless signaling access points and enabling better wireless service selection.

BRIEF DESCRIPTION OF THE DRAWINGS

FIG. 4 illustrates a cylinder associated with a focus perimeter in accordance with one non-limiting aspect of the present invention.

FIG. 5 illustrates an extension of the cylinder in accordance with one non-limiting aspect of the present invention.

FIG. 6 illustrates a flattening of the cylinder in accordance with one non-limiting aspect of the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
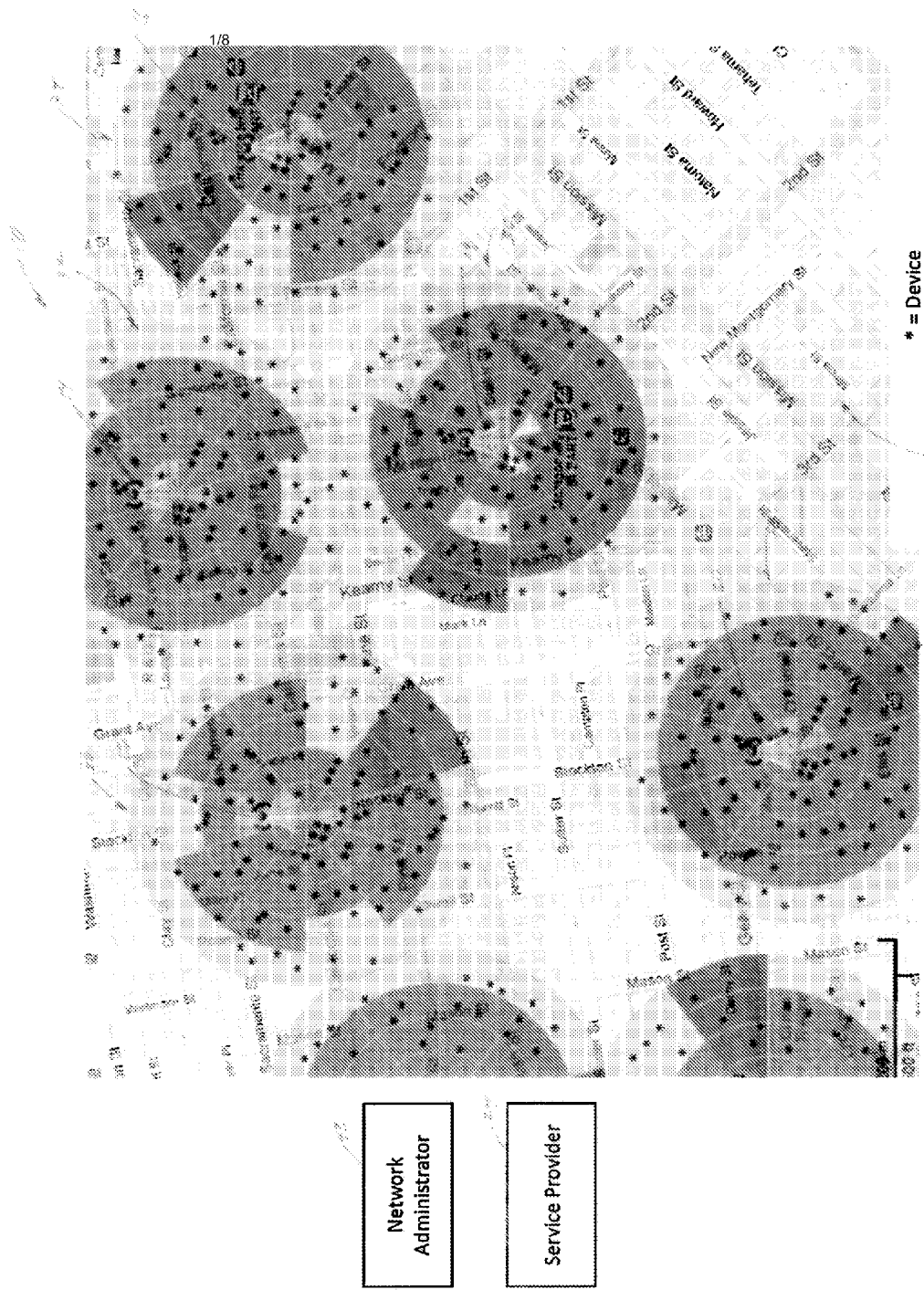
FIG. 1 illustrates an augmented reality system in accordance with one non-limiting aspect of the present invention.

FIG. 1 illustrates an augmented reality system 10 in accordance with one non-limiting aspect of the present invention. The system 10 is similar to that described U.S. patent application Ser. No. 13/649,208, the disclosure of which is hereby incorporated by reference in its entirety. The system 10 is described for exemplary non-limiting purposes with respect to facilitating visual representation of service coverage information collected for a plurality of wireless access points 12, 14, 16, 18, 20. This corresponding description is provided without necessarily intending to limit the scope and contemplation of the present invention to visualizing data associated with wireless access points 12, 14, 16, 18, 20 as the present invention fully contemplates its use and application with any type of device, system, network, etc., including incapability to facilitate use with any type of geographically data, which may be independent of the original source and underlying data. The description predominately relates to wireless access points 12, 14, 16, 18, 20 in order to demonstrate one of the many uses of the present invention to facilitate locating suitable wireless signaling and/or visually interpreting data by matching the data to its real world context. The wireless access points 12, 14, 16, 18, 20 are described with respect to facilitating Wi-Fi communications, however, the present invention is not necessarily limited to Wi-Fi communications and fully contemplates its use and application in any type of wireless communication and/or geographically orientated data, including but not limited to cellular, satellite, and any other type of radio frequency (RF) communication. The wireless signaling access points 12, 14, 16, 18, 20 may be any radio network equipment responsible for signaling service coverage including but not limited to wireless base stations for 3G/4G/LTE and access points for 802.11 Wi-Fi, Bluetooth, Zigbee and any other radio emitters.

The wireless access points 12, 14, 16, 18, 20 are shown to be associated with one or more service provider(s) 24. The service provider 24 may be configured to facilitate relaying signals and other electronic processes necessary to facilitate interfacing signaling between the wireless access points 12, 14, 16, 18, 20 and another network (not shown), such as the Internet. The service provider 24 may be associated with a high-speed data service provider, a multiple system operator (MSO), a cable/satellite/broadcast television service provider, a voice over Internet protocol (VoIP) service provider, a satellite service provider, a cellular service provider, and any other type of service provider which may rely upon wireless signaling to offer its services or facilitate operations. The wireless access points 12, 14, 16, 18, 20 may be configured to facilitate wireless related signaling and services for any number of wireless devices (labeled "*"). The wireless devices may be required to perform an authentication process with one or more of the wireless access points 12, 14, 16, 18, 20 in order to facilitate communications with the service provider 24 or devices connected to other ones of the wireless access points 12, 14, 16, 18, 20. This may require the wireless access points 12, 14, 16, 18, 20 to perform a sign-on operation, zero sign-on operation or some other operation to support Wi-Fi roaming, such as but not limited to the operations associated with U.S. application Ser. No. 12/331,331 and Wi-Fi Roaming Architecture and Interfaces Specification, CableLabs, WR-SP-WIFI-ROAM-102-20216, the disclosures of which are hereby incorporated by reference in their entirety.

The wireless devices may relate to any type of device having capabilities sufficient to facilitate wireless signaling, such as but not necessarily limited to a mobile phone, a computer, a router, a gateway, a set top box (STB), a pair of glasses, a television, etc. The wireless devices may be configured to facilitate access to virtually any type of wirelessly supportable electronic service. The services accessed through the wireless access points 12, 14, 16, 18, 20 may be dependent on the corresponding service provider 24 and/or subscription rights associated with a user of the wireless device. The wireless devices may include a processor, a memory, and other features (not shown) to facilitate processes required to facilitate connection to one or more of the wireless access points 12, 14, 16, 18, 20 and/or signaling necessary to access the desired services. The wireless devices are shown to be connected to a single one of the wireless access points 12, 14, 16, 18, 20 depending on a wireless signaling range of each wireless access point 12, 14, 16, 18, 20. The wireless signaling range of each access point 12, 14, 16, 18, 20 is spatially represented with a grid 30, 32, 34, 36, 38 used to pictorially describe a range at which the corresponding wireless access point 12, 14, 16, 18, 20 is able to operably support wireless signaling with one or more wireless devices.

The wireless devices are shown to be connected to a single one of the wireless access points 12, 14, 16, 18, 20 at the same time as it is likely that the wireless devices are limited to supporting signaling with a single wireless access point 12, 14, 16, 18, 20 at one time. The present invention fully contemplates other configurations for the wireless devices, including the capability for the wireless devices to simultaneously support communications with more than one of the wireless access points 12, 14, 16, 18, 20. In the event one of the wireless devices are positioned within a geographical location covered by two or more of the wireless access points 12, 14, 16, 18, 20, the wireless device and/or one of the wireless access points 12, 14, 16, 18, 20 may determine which one of the wireless access points 12, 14, 16, 18, 20 should be used for the wireless services. The active one of the wireless access point 12, 14, 16, 18, 20 may be selected to be the one capable to provide the most reliable or strong signaling with the wireless device and/or the one having the least congestion or the lowest cost to support communications with the wireless device. The wireless device may include capabilities sufficient to facilitate measuring signal strength and assessing and/or collecting data regarding the operating capabilities and/or performance of the wireless access points 12, 14, 16, 18, 20, which can be used to facilitate selecting which one or more of the wireless access points 12, 14, 16, 18, 20 should be connected to for establishing a service connection.

A network administrator 42 may be a device associated with the service provider 24 and/or one or more of the wireless access points 12, 14, 16, 18, 20 to manage network performance and/or to otherwise facilitate operations with the wireless devices. The network administrator 42 may be configured in accordance with the present invention to collect service coverage information regarding operation, performance, metrics and other characteristics of the wireless access points 12, 14, 16, 18, 20 and/or wireless devices in order to facilitate data visualization. One non-limiting aspect of the present invention contemplates the network administrator 42 being configured to facilitate data visualization from the perspective of the wireless devices. The perspective of the wireless devices may be based on wireless signaling and other capabilities being measured from the point of view of the wireless devices. This may require the wireless devices to sense, measure or otherwise generate at least some of the data and/or metrics reflective of wireless signaling performance or other metrics desired for data visualization. Optionally, the wireless access points 12, 14, 16, 18, 20 may be configured to generate data reflective of the wireless signaling without reliance on feedback from the wireless devices, e.g., a broadcast strength of the wireless access point may be monitored to determine the wireless range and/or other operational settings may be reviewed to infer the wireless signaling range and/or capabilities.

The ability to generate data from the perspective of the wireless devices is believed to be more beneficial than simply relying on the wireless access points 12, 14, 16, 18, 20 to generate the data. The reliance on the wireless devices allows the data to be generated from the perspective of the entity receiving the wireless signaling as opposed to entity sourcing the wireless signaling, which can be beneficial in indicating how signals are being consumed versus how they are being delivered or offered for consumption since the consumption can vary significantly from the offer. The wireless devices may be configured to transmit performance messages to the connected wireless access point and/or the network administrator 42 to report data sufficient for use with the contemplated data visualization. The messages may be considered to be performance messages and may be used to report any number of measurable service metrics regarding performance of the wireless access point, including but not limited to those associated with wireless signaling or other operations of the wireless access point. These metrics may include: one or more metrics related to the signal itself; signal strength; transmit and receive power levels; signal-to-noise ratio; performance of data transmission/reception via the signal, e.g., downstream/upstream data rate; coordinates, geo-location, or other location information regarding a location at which the data was collected; time and date of data collection; type of wireless device collecting the information, e.g., mobile device manufacturer and model number, operating system, hardware parameters; Internet Protocol related parameters such as the DHCP time, ping time to a specific set of hosts; and/or information regarding other signals detected (the magnitude of the data may be indicated with color coding (shown in gray scale)).

Figure 2:
FIG. 2a illustrates a mobile device displaying an augmented reality view in accordance with one non-limiting aspect of the present invention.
FIG. 2b illustrates the mobile device displaying a reality view in accordance with one non-limiting aspect of the present invention.
Figure 3:
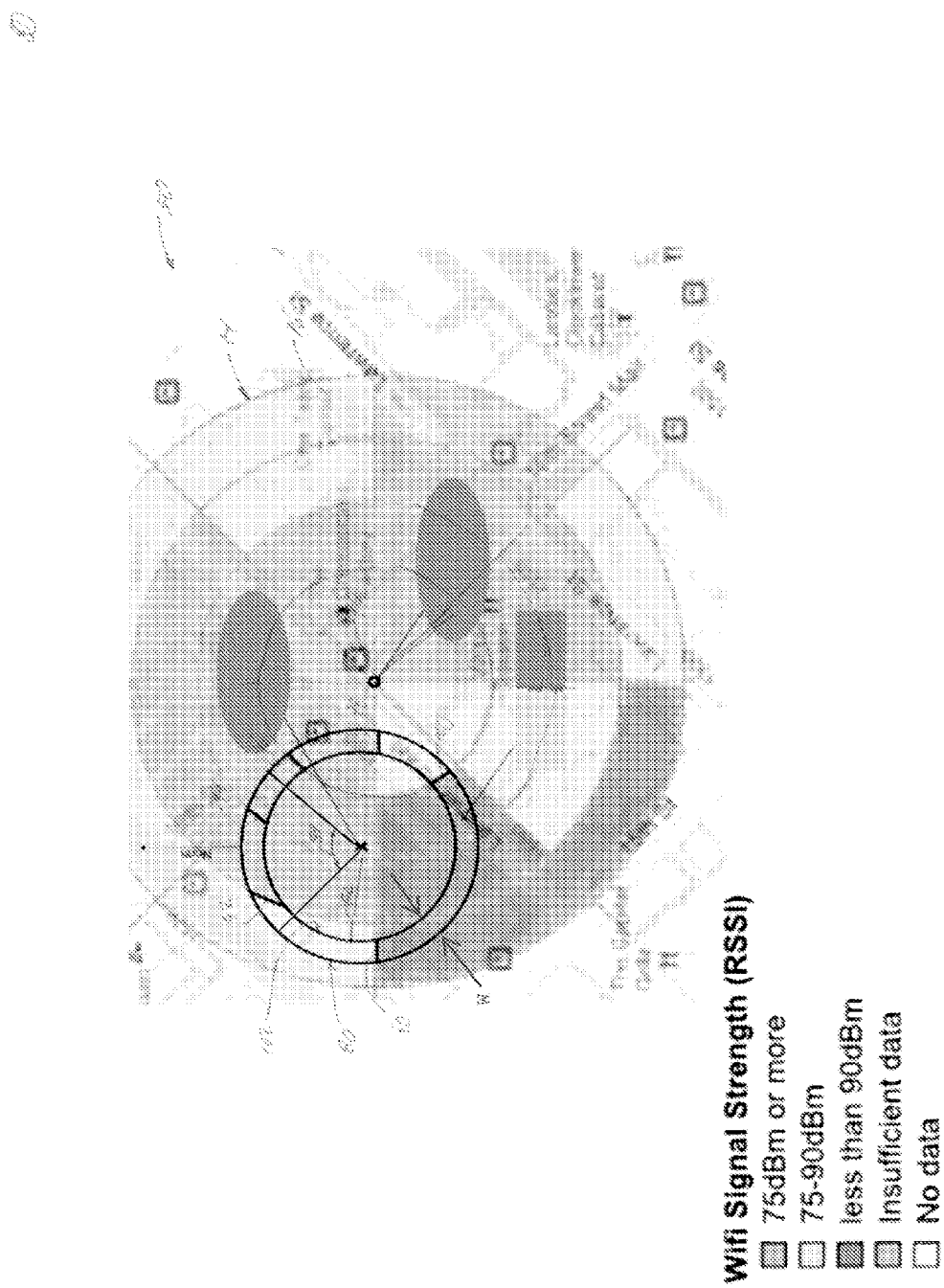
FIG. 3 illustrates a relation of the augmented reality view to an area proximate the mobile device in accordance with one non-limiting aspect of the present invention.

FIG. 2a illustrates a mobile device 60 displaying an augmented reality view 62 in accordance with one non-limiting aspect of the present invention. The augmented reality view 62 is shown to include a reality view 64 augmented (FIG. 2b) with service coverage information 66. The service coverage information 66 may overlay the reality view 64 in order to visually represent selectable service metrics, which for exemplary non-limiting purposes are shown to be RSSI, download speed and DHCP time measures where RSSI is currently selected. The service coverage information 66 is shown to be visually represented using a color coding scheme that identifies signaling strength variances (or other selectable service metrics) for a particular access point relative to a position of the mobile device 60. The service coverage information may be determined by the mobile device 60 from service coverage messages transmitted by the network administrator 42 based on service coverage information collected from other devices. The mobile device 60 may be configured to process the service coverage messages in order to generate the color-coded variances. The service coverage information 66 may be displayed for any one or more of the data elements or service metrics collected by the network administrator 42. The service coverage information 66, in particular the variances associated therewith, may be visually represented with other visual indicia in addition to or in place of the illustrated color coding. The focus perimeter adjust (depicted as a slider control) determines the diameter of the focus perimeter 82 which controls the data used to augment the reality view FIG. 3 illustrates a relation of the augmented reality view to an area proximate the mobile device in accordance with one non-limiting aspect of the present invention. The area proximate the mobile device 60 is shown to be within a wireless signaling range of a particular access point 70. The signaling strength variations within the wireless signaling range are shown to be specially represented within a grid 74 centered at the access point 70. The grid 74 may include a color coding scheme similar that noted above to indicate various performance levels according to a particular one of a plurality of colors. For exemplary non-limiting purposes, three colors (yellow, green, and red) are shown to visualize three different levels of performance. The green color is used to describe a high level of performance, the yellow is shown to describe a middle level of performance, and the red is shown to describe a low level of performance. In this manner, the present invention contemplates displaying or otherwise pictorially describing performance gradients using color coding or other visual values sufficient to spatially relate areas of the wireless access point relative to any one or more of the metrics noted above or otherwise reported for the wireless access points.

The color-coded grids 74 are shown to be overlaid relative to a street map 50. The street map 50 may be an electronic representation of a geographical area proximate to each of the wireless access points 12, 14, 16, 18, 20. The street map 50 may indicate streets, buildings, businesses, bus stops, and any other information regarding the area proximate to each of the wireless access points 12, 14, 16, 18, 20. The color-coding grids may be scaled to the street map 50 in order to visually indicate an approximate range of the wireless access points 12, 14, 16, 18, 20 relative to components shown within the street map 50. This may provide the viewer an accurate description of distances at which wireless signals are being operably transmitted from the wireless access points 12, 14, 16, 18, 20. The network administrator 42, service provider 24 or other entity may use this visual representation of performance to assess a particular geographical area for wireless performance, e.g., whether the wireless access points 12, 14, 16, 18, 20 are providing sufficient wireless signaling coverage to desired geographical areas. A review of the color-coding grids allows the administrator to visually identify red portions corresponding with low levels of performance, i.e., without having to undertake a cumbersome process of relating numerical representations of performance to geographical coordinates in order to identify particular geographical areas within the wireless signaling range of a wireless access point 12, 14, 16, 18, 20 having signaling difficulties and/or those performing a desired signaling levels.

The wireless devices reporting performance messages 44 and other values used to generate the color-coded grid 74 have been removed except for the mobile device (indicated with "x") for which the augmented reality view is generated. The color-coded grid 74 may segment a wireless signaling range of a wireless access point according to a track, a sector, and a cell 76 (only one is labeled). Each of the track, sector, and cell may correspond with a different geographical area of the wireless access point. Each cell is shown to be radially arranged relative to a center portion of the grid corresponding with the wireless access point. This is done for exemplary non-limiting purposes as the cells may be arranged in any other manner. The illustration is provided with the assumption that the wireless access point 70 includes an omnidirectional antenna to facilitate the wireless signaling. The shape and contour of the grid 74 may change depending on the configuration of the antenna and its typical or operational transmission range, i.e., the grid 74 may be being shaped or non-circular depending upon the particular transmission capabilities or restrictions of the antenna or other feature of the wireless access point from which the grid is generated. The size and shape of the cells may be adjusted depending on a desired level of granularity.

A focus perimeter 80 may be established relative to the mobile device to facilitate selecting the service coverage information shown within the augmented reality view. The focus perimeter 80 may be characterized as a radius 82 having a length measured from the mobile device 70 such that a diameter of the focus perimeter 80 may be increased with a lengthening of the radius 82 and decreased with a shortening of the radius 82. The corresponding increase and decrease in diameter of the focus perimeter 80 may be used to selectively increase and decrease the service coverage information available for visual representation within the augmented reality view 62. Optionally, the length of the radius 82 may be increased/decreased to adjust a width W of the focus perimeter 80, thereby increasing/decreasing the amount of presented data. The grid 74 may include a plurality of cells within the boundaries of the focus perimeter 80 such that the service coverage information made available for inclusion within the augmented reality view 62 corresponds with the service coverage information of the encircled cells. While the focus perimeter is described with respect to being a diameter centered at the mobile device 70, the present invention is not necessarily so limited and fully contemplates the use of other scaling techniques to facilitate filtering the service coverage information made available for visual representation within the augmented reality view 62.

A viewing angle 84 may be established relative to the mobile device 70 to facilitate further filtering of the service coverage information shown within the augmented reality view 62. The viewing angle 84 may determine a width of the reality view 62 shown within the mobile device 70 (see FIG. 2). The scaling of images included within the reality view 62 may be proportional to the viewing angle 84 in that a wider viewing angle may be used to capture a wider set of images and a narrower viewing angle may be used to capture a narrower set of images. The mobile device 70 may include an imaging element, such as but not necessary limited to a digital camera or video processor, capable of adjusting the viewing angle 84 according to user inputs to the mobile device 70 and/or according to instructions received from the network administrator 42 or specified within the service coverage information messages. In the event a digital camera is used to capture the reality view 62, the viewing angle 84 may include bars or other non-image portions at lateral sides if the digital camera is unable to capture images as wide as the viewing angle 84.

The viewing angle 84 may be used to further filter the service coverage information identified to be within the boundary of the focus perimeter 80. The filtering may correspond with preventing visual representation of the service coverage information beyond the viewing angle 84. The service coverage information currently beyond the illustrated viewing angle 84 may be subsequently displayed by adjusting the viewing angle 84 and/or rotating the mobile device 70 to point toward at a different portion of the focus perimeter. A plurality of intersections 90, 92, 94, 96, 98, 100 are shown where a cylinder 102 defined by the focus perimeter 80 intersects with cell boundaries associated with the grid. These intersections 90, 92, 94, 96, 98, 100 may define the variances visually represented within the augmented reality view when the intersections correspond with a change in the represented service coverage information. The intersections 90, 92, 94, 96, 98, 100 may be used to demarcate the color coding change boundaries illustrated within the augmented reality view. One non-limiting aspect of the present invention contemplates visually representing the variances without overlaying the service coverage information in the manner depicted in FIG. 2, such as by instead individually color coding the objects, buildings, entities, and other definable images. This entity specific coding may rely on the individual objects to define the variance boundaries instead of or in addition to the intersections.

FIG. 4 illustrates the cylinder 102 associated with the focus perimeter in accordance with one non-limiting aspect of the present invention. The cylinder 102 may be used to define a cross-section of the crowd sourced data associated with the grid, e.g., a selection of data from around the device 60 at the focus perimeter distance. FIG. 5 illustrates an extension 104 of the cylinder 102 in accordance with one non-limiting aspect of the present. The extension is shown to represent vertical height of the signaling strength or other service coverage information being color-coded within the grid. The vertical representation may be defined relative to the augmented reality view 62 such that the vertical plane is defined from a bottom to a top of the mobile device. This representation may be a transformation from the 2D representation (FIG. 4) to a 3D (FIG. 5), assuming constant signal parameters in the vertical dimension. It would also be possible to perform this transformation with service coverage data if the vertical aspect of signal parameters was previously captured and available, making for a more complex and comprehensive transformation. FIG. 6 illustrates a flattening 106 of the cylinder 102 in accordance with one non-limiting aspect of the present invention. The flattening may correspond with the cylindrically shaped vertical representations shown in FIG. 5 being flattened to facilitate visual presentation of the service coverage information. This may be done to bisect the cylinder 102 to form an oriented rectangular representation of the data.

Figure 7:
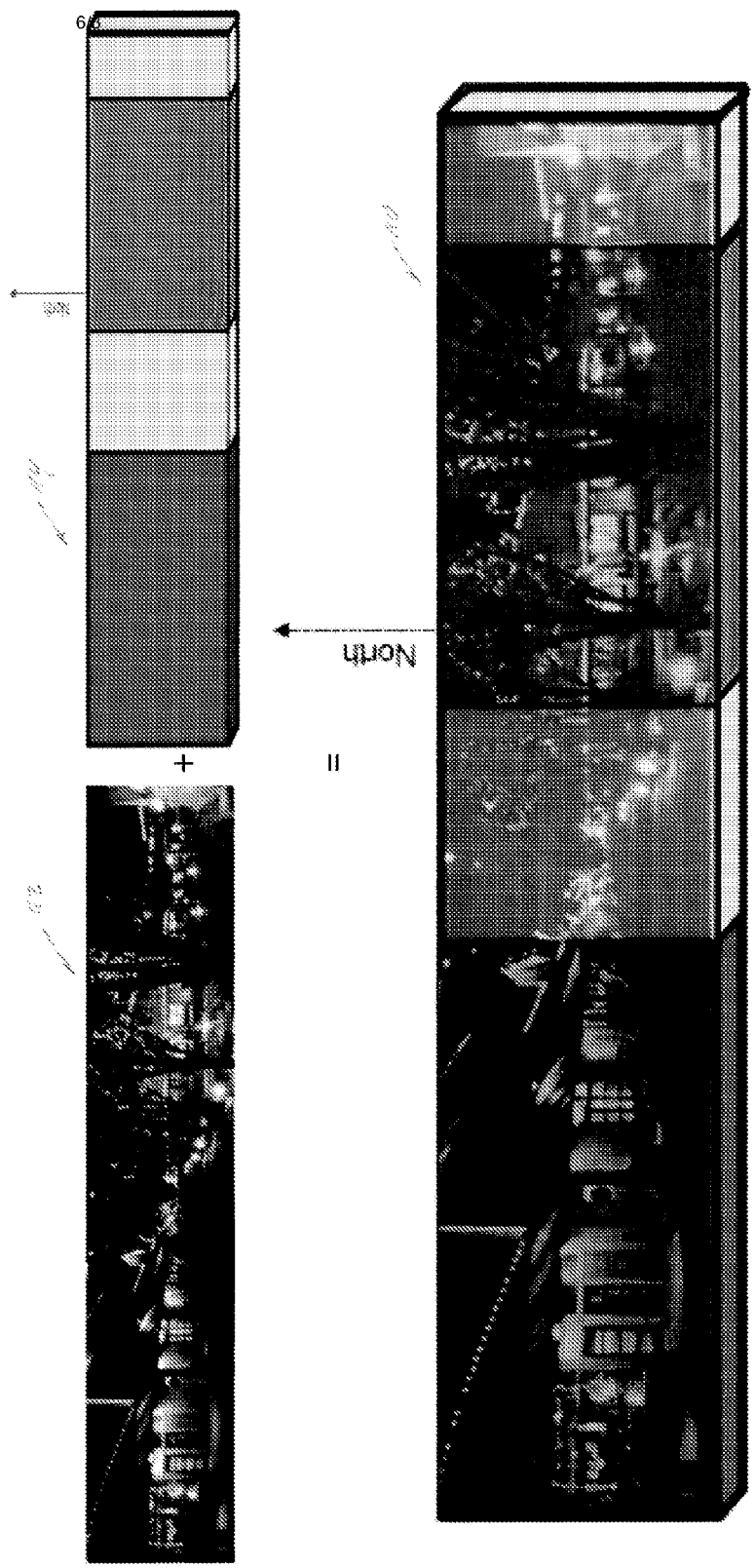
FIG. 7 schematically illustrates generating an augmented reality view in accordance with one non-limiting aspect of the present invention.

FIG. 7 schematically illustrates generating an augmented reality view 110 in accordance with one non-limiting aspect of the present invention. The augmented reality view 110 may be generated by augmenting a reality view 112 with a visual representation 114 of service coverage information. The augmented reality view 110 is shown to include the service coverage information 114 overlaying the reality view 112, such as to overlay the orientated rectangular data depiction with mobile device camera view, matching orientation and location of the two images. The overlay configuration appears as though the service coverage information 114 is in front of the reality view 112 in a different plane. Another visual representation of the service coverage information may include painting or otherwise color coding objects, structures, etc. appearing within the reality view individually instead of providing an overlay. This may result in the corresponding color coding or other visual representation appearing within the same plane as the reality view objects instead of appearing in front as an overlay. The augmented reality view 110 illustrates the service coverage information with consistent vertical performance of the visually represented service metric, i.e., the wireless signaling strength or other performance data being displayed. The service coverage information may not necessarily be vertically consistent such that the corresponding visual representation may be adjusted according to any perceived, estimated, calculated or assumed vertical variances. The reality view 64 and the augmented reality view 62 may be orientated to represent the same physical location.

Figure 8:
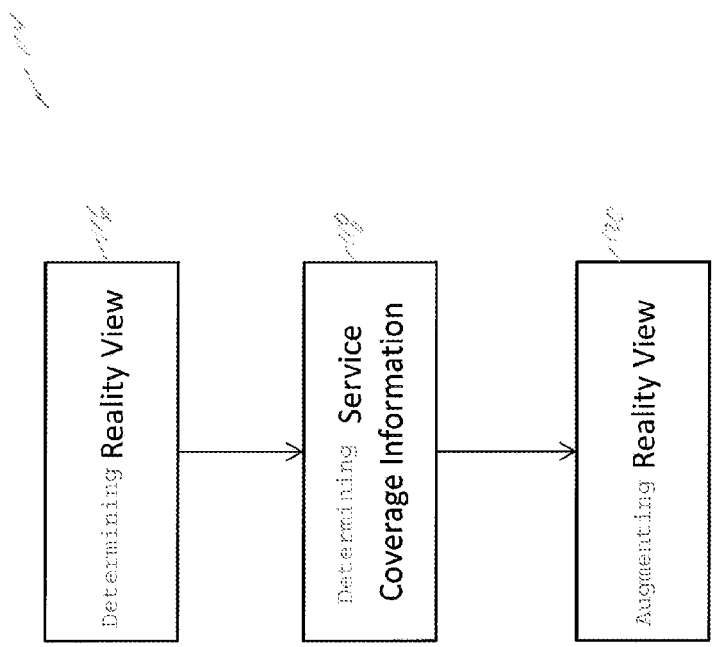
FIG. 8 illustrates a flowchart of a method for service coverage identification using augmented reality in accordance with one non-limiting aspect of the present invention.

FIG. 8 illustrates a flowchart 114 of the method for service coverage identification using augmented reality in accordance with one non-limiting aspect of the present invention. The method may be facilitated with an augmented reality application configured in court with the present invention being downloaded to a mobile device. The augmented reality application may be associated with a computer-readable medium/device of a mobile device having non-transitory instructions stored thereon which are operable with a processor of the mobile device to facilitate visually representing service coverage information in the form of augmented reality. The method is predominately described with respect to a mobile device collecting information and data associated with facilitating the augmented reality view, however, the present invention is not necessarily so limited and fully contemplates the augmented reality view being generated remotely at a server or with another entity and then subsequently transmitted to the mobile device, which may be helpful in ameliorating processing demands placed on the mobile device to facilitate operations contemplated to provide augmented reality view.

Block 116 relates to determining a reality view. The reality view may correspond with an image or other media captured by a mobile device relative and/or otherwise transmitted to the mobile device. The augmented reality view may also be facilitated with a non-mobile device or a remotely controlled device (a security camera) which may be manipulated to capture reality view. The reality view may include actual images or actual reality of an area proximate the mobile device so that a user can relate the surrounding environment to images or other content showing within a display of the mobile device. The reality view may be adjusted in size, scale or other aspects depending on user interaction with an imaging element or other feature of the mobile device used to capture the reality view. The manipulation of the reality view may include setting a focus perimeter and/or a viewing angle. The reality view may change in real-time with movement or manipulation of the mobile device such that the corresponding augmented reality view may be dynamically updated to allow the user to easily identify areas having desired levels of service coverage performance.

Block 118 relates to determining service coverage information to be used and augmenting the reality view. The method is also predominately described with respect to augmenting the reality view to display wireless signal strength information, however, the present invention is not necessarily so limited and fully contemplates augmenting the reality view to facilitate visually representing or otherwise communicating (audio, tactile, etc.) other types of service coverage information. The method contemplates augmenting reality for any one of the service metrics or performance parameters noted above may be similarly used to augment the reality view. The service coverage information may be selected according to user inputs to the mobile device, such as by selecting one of the service coverage information menu options (see FIG. 2). Once the particular service coverage information is selected, or before, the corresponding data to be using augmenting the reality view may be transmitted to the mobile device. The service coverage information transmitted to the mobile device may be include service coverage information for one or more of the access points within a vicinity of the mobile device (which may be limited to those having capabilities sufficient to support signaling with the mobile device) and/or the transmitted service coverage information may be filtered according to the focus perimeter and/or viewing angle.

It is possible that a selected focus perimeter is large enough that it represents areas behind structures in the reality view. In this situation, the service coverage information represents areas not visible to the user, which may be done to in essence allow a user to see through walls. In this sense, by the present invention is predominately described with respect to augmenting reality, in this case, the present invention includes capabilities to allow the user to experience a reality beyond the physical one—to virtually travel beyond physical sight to experience environmental meta data beyond the range of the physical sight.

Block 120 relates to facilitating an augmented reality view. The augmented reality view may correspond with a reality view being augmented with service coverage information. The augmented reality view may be dynamically and continuously updated to render new reality view as the mobile device is manipulated, e.g., manipulation resulting from the user changing the focus perimeter and/or viewing angle and/or the user or a remote-control changing a position or orientation (location) of the mobile device. Each change in the reality view may be automatically augmented with corresponding re-filtering of the service coverage information so that the displayed service coverage information properly relates to the current reality view. The ability to continuously adjust the augmented reality view to reflect manipulation of the mobile device may be helpful in allowing the user to easily identify locations where wireless access points are likely to be or whether the access points are likely to have capabilities sufficient to meet the wireless signaling demands of the individual, particularly when endeavoring to access wireless services in an area unfamiliar to the user. Accordingly, the present invention contemplates ameliorating these types of difficulties by assisting the individual in locating suitable wireless signaling/access points.

As supported above, one non-limiting aspect of the present invention contemplates methods to determine, display and/or render Wi-Fi and more generally wireless service coverage using an augmented reality applications capable of representing data collected by service subscribers. The augmented reality application may facilitate visually display for the quality of a wireless service (3G, 4G, HSPA, EDGE, Wi-Fi, . . . ) on top of a real-life video feed based on information collected by other subscribers around this location. A client application running on a mobile device or laptop collects and reports quality of service metrics to a system called a data collection server that may in turn be used to augment reality for other devices, e.g., data collected by a number of devices may be used to augment reality for one or more devices. The list of the collected quality metrics may include but is not limited to wireless signal strengths perceived by the client devices (RSSI), others are speed test results for uplink/downlink speed. Some subjective metrics may include the number of incident reports for this wireless service at this location in the past hour, past day, etc.

Figure 9:
FIG. 9 illustrates a proximity assist street view in accordance with one non-limiting aspect of the present invention.

These or other types of service metrics may then be correlated to produce higher-level indicators of the wireless service quality: access coverage (wireless bars), Internet connectivity (once connected, Internet service is good), authentication measures (all service elements granting access to the network function properly and respond to client requests). At a given location, the quality indicators of the surrounding areas may be translated in graphical elements that can be displayed and rendered on top of an augmented (AR) view. The AR view may include: a transparent color layer on top of reality view; simple graphic displays such as icons, gauge bars, to provide an indication of the quality of service; and/or buildings, coffee shops recognized and colored according to the their location and the distance between the point of view and their location. FIG. 9 illustrates a proximity assist street view 130 having augmented reality in accordance with one non-limiting aspect of the present invention. The proximity assist review 130 may be used to provide an indication of the quality of service for surrounding buildings relative to their location and the distance between the point of view and their location.

One non-limiting aspect of the present invention contemplates a display of wireless service coverage information using AR applications based on correlation metrics computed from distributed data gathering. The invention may be used to represent an accurate view of the service coverage by polling, correlating and representing metrics based on a massive amount of data points collected by other subscribers in the area near you. The invention may be used to render those metrics (transparent layers, colored buildings around you, graphic objects in the AR views to display metric coverage). The invention may be used to calculate the polygons' coordinates and their color transparency based on the view point location, correlation metrics in the database and field of view due to wireless technology. Customization of the AR views may be based on the field of view of the subscriber and the radio technology used: Wi-Fi coverage is shorter than HSPA based on a location of an antenna and representation of the field of view is based on the radio technology and the collected subscriber data for that technology. Customization of the AR view may optionally be based on a device or user profile. Devices, for example, may have a particular dB loss profile: one type of mobile phone may have worse coverage than another type or mobile phone or a mobile tablet that has a bigger antenna and designed to optimize Wi-Fi received signal strength. The AR view or map may be customized based on the available profiles.

One non-limiting aspect of the present invention contemplates solving where to find better wireless coverage based on where a user is currently positioned and/or where a user may be located next. The present invention may be used to display real-time information based on how many subscribers are connected to the wireless antennas or towers at any given point in time, their usage of the network, or just use empirical data based on time of day, last hour peak traffic, etc.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of representing wireless service coverage information for one or more access points configured to facilitate wireless signaling, the method comprising:

determining a reality view relative to one or more of the access points;

determining service coverage information for the plurality of access points;

visually augmenting the reality view with the service coverage information to generate an augmented reality view;

determining the service coverage information to include signal strength information, the signal strength information spatially relating wireless signaling strength of each access point;

determining a focus perimeter sufficient for spatially relating the plurality of access points to the reality view, a length of the focus perimeter from a source of the reality view defining an area proximate to the reality view;

selecting the signal strength information visually represented within the augmented reality view to correspond with the access points within the area such that more access points, and thereby more signaling strength information, is visually represented when the length is longer than when the length is shorter; and adjusting a viewing angle of the reality view shown in the augmented reality view in proportion to the length of the focus perimeter such that the viewing angle is wider when the length is longer and narrower when the length is shorter, the viewing angle defining a percentage of the reality view shown within the augment reality view such that a greater percentage of the reality view is shown when the length is longer than when the length is shorter.

2. The method of claim 1 further comprising visually representing the signaling strength information with color coding of the augmented reality view where different colors are used to represent variances in signaling strength, including varying the colors along a vertical dimension of at least a portion of the augmented reality view as the signal strength correspondingly varies in height.

3. The method of claim 2 further comprising color coding elements depicted within the reality view such that the color coding appears to one of overlay or appear to be within the same plane as the elements.

4. The method of claim 1 further comprising:
determining the service coverage information to include at least one of uplink/downlink speed, coverage area, Internet connectivity and authentication measures for the plurality of access points; and
visually representing at least one of uplink/downlink speed, coverage area, Internet connectivity and authentication measures within the augmented reality view.

5. The method of claim 1 further comprising determining the service coverage information from service coverage messages transmitted from a network administrator associated with the access points, the access points being configured to facilitate at least one of cellular wireless signaling and Wi-Fi wireless signaling and to determine the signal strength information included in the augmented reality view using relative signal strength information (RSSI) measurements generated with mobile devices in communication therewith.

6. The method of claim 1 further comprising:
determining the source of the reality view from an image captured with a digital camera of a wireless device positioned within a vicinity of one or more of the access points such that the reality view shown within the augmented reality view is centered at a position of the wireless device; and
visually representing service coverage information within the augmented reality view for one or more access points beyond a viewing range of the digital camera.

7. The method of claim 1 further comprising: determining the source of the reality view to be centered at a mobile device; and
determining the access points to be within the area if wireless signaling emitted therefrom crosses a perimeter spaced apart from and centered at the mobile, a distance of the perimeter to the mobile device being proportional to the length.

8. A non-transitory computer-readable medium having non-transitory instructions stored thereon which are operable with a processor of a mobile device to facilitate representing wireless service coverage information for one or more access points configured to facilitate wireless signaling, the computer-readable medium having non-transitory instructions for:

determining a reality view of an area proximate to the mobile device, the reality view having a horizontal dimension and a vertical dimension;

augmenting the reality view with the service coverage information to generate an augmented view sufficient for visually representing the service coverage information using color coding, the color coding varying horizontally to represent variances in the horizontal dimension and varying vertically to represent variances in the vertical dimension;

determining the service coverage information to include at least one of signaling strength, uplink/downlink speed, coverage area, Internet connectivity and authentication measures for the plurality of access points;

visually representing at least one of the signaling strength, uplink/downlink speed, coverage area, Internet connectivity and authentication measures within the augmented view using the color coding where different colors are used to represent variances in the at least one of signaling strength, uplink/downlink speed, coverage area, Internet connectivity and authentication measures;

determining a focus perimeter for the augmented view according to a user input made to the mobile device, a length of the focus perimeter representing a distance from the mobile device to a perimeter radially centered at the mobile device;

filtering the service coverage information visually represented within the augmented view depending on the length of the focus perimeter such that the visually represented service coverage information is limited to the access points having wireless signals reaching the perimeter;

determining a viewing angle of the augmented view in proportion to the length of the focus perimeter such that the viewing angle is wider when the length is longer and narrower when the length is shorter;

determining the reality view from images captured with an imaging component included as part of the mobile device;

determining an amount of the reality view to be shown within the augmented view according to the viewing angle such that a greater amount of the reality view is shown when the viewing angle is wider and a lesser amount of the reality view is shown when the viewing angle is narrower; and adding bars or non-image portions to lateral sides of the reality view shown within the augmented view in the event the reality view is unable to a fill an entire width of a display of the mobile device showing the augmented view.

9. The computer-readable medium of claim 8 further comprising instructions for:
determining the reality view from images wirelessly transmitted to the mobile device;
generating the augmented view through subsequent augmentation of one or more of the wirelessly transmitted images; and
displaying the augmented view within a display included as part of the mobile device.

10. The computer-readable medium of claim 8 further comprising instructions sufficient for:
limiting the service coverage information visually represented within the augmented view to a first access point of the access points;
visually color coding the augmented view in a first pattern when the length is a first length; and visually color coding the augmented view in a second pattern different than the first pattern when the length is a second length different than the first length, thereby adapting the color coding according to service coverage variations related to the wireless signals reaching the perimeter differently depending on whether the perimeter coincides with the first length or the second length.

11. A non-transitory computer-readable medium having non-transitory instructions sufficient for use with a mobile device to facilitate:
   determining a reality view proximate to the mobile device, the reality view at least partially including images of a surrounding environment captured with an imaging feature of the mobile device;
   determining a focus perimeter and a viewing angle as a function of user input to the mobile device or instructions transmitted thereto from a network administrator, the focus perimeter representing a perimeter spatially apart from and radially centered at the mobile device, the viewing angle representing a segment of the perimeter angularly coinciding therewith;
   determining signaling strength information for one or more wireless access points within a vicinity of the mobile device;
   augmenting the reality view to generate an augmented view sufficient to visually represent the signaling strength information for each wireless access point having wireless signaling traversing the segment;
   displaying the augmented view with a display feature of the mobile device;
   visually representing signaling strength information for access points positioned relative to the mobile device so as to be unavailable for image capture using the imaging feature; and
   visually representing signaling strength information for a first wireless access point and not a second wireless access point, the first wireless access point sourcing wireless signaling reaching the segment without being operably received at the mobile device and the second wireless access point sourcing wireless signaling operably received at the mobile device without reaching the segment.

12. The non-transitory computer-readable medium of claim 11 further comprising non-transitory instructions for:
   color coding the signal strength information according to relative signaling strength of the corresponding wireless signaling as the wireless signaling reaches a boundary defined by the segment, including varying the color coding horizontally to represent horizontal variations in signaling strength along the boundary and varying the color coding vertically to represent vertical variations in signaling strength.

* * * * *